June 28, 1966   J. H. ANDERSON   3,258,199
SHAFT SEAL AND BEARING FOR ROTATING MACHINERY
Filed Oct. 12, 1964   2 Sheets-Sheet 1

INVENTOR.
JAMES H. ANDERSON
ATTORNEYS.

United States Patent Office 3,258,199
Patented June 28, 1966

3,258,199
SHAFT SEAL AND BEARING FOR ROTATING
MACHINERY
James H. Anderson, 1615 Hillock Lane, York, Pa.
Filed Oct. 12, 1964, Ser. No. 403,234
13 Claims. (Cl. 230—207)

This invention relates generally to a seal and bearing system for rotating shafts and in particular to a new hydrostatic-dynamic bearing and seal combination for providing positive segregation of the working fluid from lubricants in turbines, compressors and similar rotating machinery.

This invention is specifically adapted for, but not limited to, use in a closed cycle vapor powerplant system such as that disclosed in applicant's copending application, Serial No. 373,661, filed June 9, 1964, and is of particular benefit in providing fluid segregation between the working fluid and lubricants for the vapor turbine disclosed therein.

In a vapor system such as that of the above-referred-to application, it is of particular importance that the halocarbon working fluid in the closed cycle be maintained in an uncontaminated state since contamination of the halocarbon and particularly contamination by hydrocarbon lubricants will adversely affect the system and eventually destroy the properties of the halocarbon which make it particularly useful as the boiling fluid for the system.

In solving the above problem, it would be extremely desirable to utilize either the working fluid itself or some fluid compatible with the working fluid to provide lubrication for the bearing most proximate that fluid, thereby avoiding contamination from leakage through that bearing. Halocarbon working fluid or fluids which are compatible therewith have, however, rather poor lubricating properties and would not be satisfactory for use for conventional lubricating purposes in bearings which are subjected to the normal mechanical loads imposed in the above-described system.

Conventional sliding seals of the prior art are, furthermore, not capable of providing the degree of isolation of the lubricant fluids from the working fluid of system for long periods in a time. Prior art seals, which would have the necessary tightness to furnish the required sealing effectiveness, would be subjected to large rubbing forces and speeds over an extended period of time. These seals would therefore eventually deteriorate in the type of service contemplated, rapidly allowing a small leakage between the sealing surfaces due to mechanical wearing thereof.

It is an object of this invention to provide a novel seal and bearing structure for rotating turbo-machinery which allows utilization of the working fluid thereof for hydrodynamic lubrication of the main bearing by isolating the main bearing from system weight and mechanical forces normally imposed by the machine power train.

It is also an object of this invention to provide a durable fluid seal and bearing structure for rotating fluid machinery operating on a closed-cycle fluid system which affords proper lubrication for the machinery with a maximum segregation of the lubricant from the working fluid by providing a hydrostatic-dynamic fluid bearing, which is isolated from substantially all mechanical forces normally imposed on the machinery.

It is also another object of this invention to provide, in combination with the last-mentioned object, a novel seal for the rotating members, the seal segregating the hydrostatic-dynamic bearing fluid from the lubricant for the conventional bearings of the system, and having a minimum diameter and multiple component sealing faces to provide both minimum rubbing speed and, by achieving a minimum pressure differential across the sealing faces thereof, imposing a minimum rubbing face pressure thereon.

It is a further object of this invention to provide a novel hydrostatic-dynamic bearing for the system described in which surface-to-surface rubbing contact is prevented when the rotation of the machinery is initiated by furnishing fluid flow through a novel bearing configuration to initially dispose and maintain the surfaces out of contact.

It is another object of this invention to provide a fluid seal having a pressure balance between fluids across the sealing faces thereof and a pressure balance between the forces acting on the sealing surfaces to provide a maximum sealing effect with a minimum of sealing pressure therebetween.

It is still a further object of this invention to provide a mechanically isolated hydrostatic-dynamic bearing in combination with a novel sealing structure to isolate the fluid of the bearing, the system so configured that the sealing surfaces of the structure are of minimum diameter thereby maintaining the seal and area rubbing speed at a minimum.

It is still a further object of this invention to provide a combination hydrostatic-dynamic bearing structure isolated from mechanical load in combination with a sealing structure, the combination being configured to occupy a minimum axial space.

These and other objects of the invention will become better understood by reference to the following detailed description when viewed in light of the accompanying drawings wherein like numerals therein indicate like parts throughout the figures thereof and wherein.

The primary feature of this invention involves the provision of a hydrostatic-dynamic bearing next adjacent to a fluid turbine, compressor or the like, the bearing operating on fluid which is compatible with the turbine working fluid thereby obviating working fluid contamination from the closest or most adjacent bearing thereto. It should be understood at this point that, as used throughout the specification and claims herein, the terms hydrostatic dynamic bearing, hydrostatic bearing and/or hydrodynamic bearing, as opposed to conventional bearings, indicate a bearing wherein all of the load thereon is carried by a film generated in part by the hydrostatic action generated by the pressure of fluid forced through the bearing and in part by hydrodynamic action generation by the relative motion of the shaft in the bearing, the former alone when the shaft is not rotating and/or the latter alone when the shaft is rotating respectively.

Although it is realized that there is hydrodynamic action in conventional bearings, the above terms are defined as excluding conventional bearings for purposes of clarity and simplicity. Conventional bearings are defined as used through the specification and claims as including all bearings such, for example, as friction, roller, ball and the like, with the exception of the above-defined dynamic bearings. Since hydrostatic-dynamic bearings do not effectively withstand large mechanical forces or loads normal to the axis thereof, the bearings are isolated from such loads by flexible shaft connected to a rigid shaft, the rigid shaft being supported by at least two conventional bearings displaced from the turbine, compressor, or the like, which bearings take up substantially all of the mechanical forces and loads of the shaft system. The conventional bearings must be lubricated by conventional lubricants and since these contaminate the working fluid, this invention further incorporates sealing means to isolate the conventional bearings from the hydrostatic-dynamic bearings. This sealing means, due to the novel structure and configuration provided by the aforedescribed members, is particularly efficient and durable and utilizes plural segregated pressurized lubricating fluids thereby increasing the efficiency of the seal since pressure differentials between these fluids may be equalized to minimize the pressure differential across the sealing faces.

Figure 1:
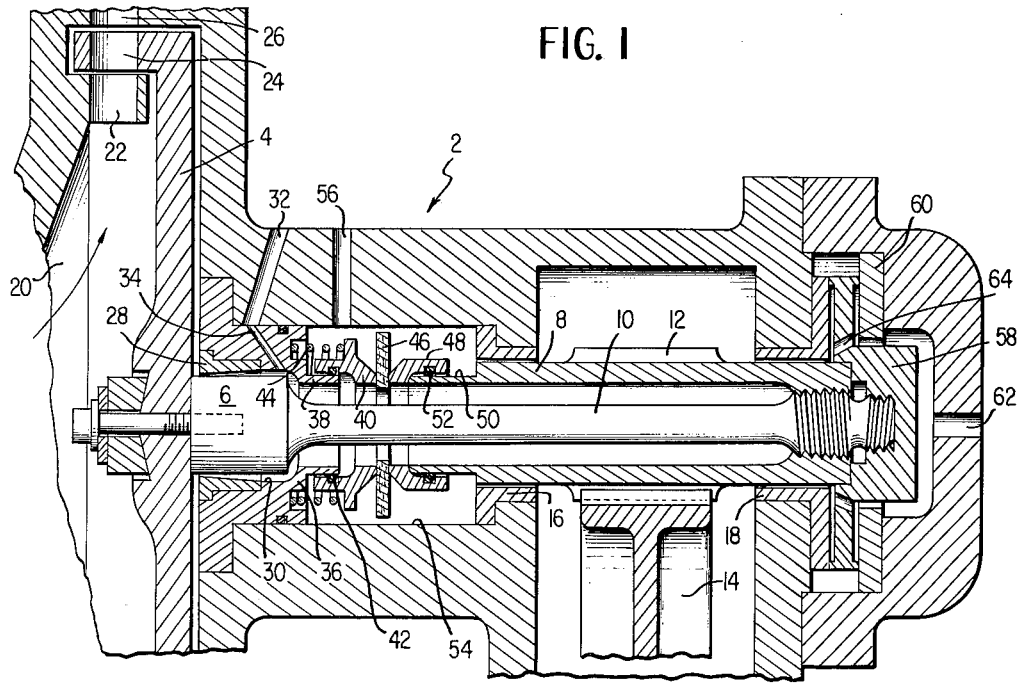
FIGURE 1 is an elevational view, in section and partly broken away, of a fluid bearing and seal structure in accordance with the invention incorporated in a power turbine.

Referring now to FIGURE 1, a power turbine structure, shown generally at 2, consists basically of a turbine wheel 4 mounted on a cylindrical hub 6 which is connected to an annular sleeve 8 by a flexible shaft 10. The annular sleeve 8 has, mounted thereon, a gear 12 which is drivingly connected to a power gear 14 providing the power train from the turbine. Conventional bearings 16 and 18 are disposed on the sleeve 8 on either side of the gear 12 and operate to absorb the mechanical loads imposed on the sleeve 8 through the driving force between the gears 12 and 14.

The turbine operates on the vapor phase of a working fluid which enters at the turbine inlet 20 and, in the direction of the arrow, passes through a ring of nozzles 22 impinging upon a row of blades 24 mounted around the periphery of the turbine and passes into the diffuser and exhaust passage 26 for return through the system. The reaction of the vapor impinging upon the blades 24 rotates the turbine 4, hub 6, and through shaft 10, sleeve 8 to rotate the gears 12 and 14.

The hydrostatic-dynamic bearing for the system is located adjacent the turbine and consists of a tapered insert 28 surrounding the cylindrical hub 6 of the turbine. The minor diameter of the insert 28 is slightly greater than the outer diameter of the hub 6, the minor diameter being disposed most proximate the turbine 4 so that the inner bore of the insert 28 tapers inwardly toward the turbine. The relative dimensions of the components of the bearings are best determined by the requirements of the particular use through the use of conventional fluid flow theory. A chamber 30 communicates with the inner bore of the insert 28 and is in communication with a source of pressure through supply channels 32 and 34 in the turbine housing.

The shaft 10 has mounted, around the turbine end thereof, an annular fixed seal support 36 having a reduced section thereto which is provided with a cylindrical sealing surface 38 approximately equal in diameter to the hub 6. A nonrotating annular seal member 40 is slidably mounted over the surface 38, sealing being accomplished between the sealing surface 38 and the seal 40 by an O-ring-type packing member 42 disposed in a recess in the interior of the seal member. A spring 44 biases the sealing member 40 against a floating seal ring 46 which is backed up by a rotating seal member 48 slidably mounted around a rotating cylindrical sealing surface 50 on the sleeve 8. An O-ring-type packing member 52 is disposed in a groove on the inside surface of the sealing member 48 to provide sealing between the surface 50 and that sealing member.

The sealing members 40 and 48 may be made of metal with the sealing surfaces thereof accurately lapped to a flat surface as is commonly done in the art. The ring 46 is preferably formed of a material having self-lubricating properties such as carbon, graphite or the like.

The walls of the bore 54, concentrically disposed in the turbine housing, form a chamber around the aforedescribed sealing members. A conventional lubricant supply channel 56 provides communication between that chamber and a source of lubricant (not shown) to provide lubrication for bearing 16. Referring to the end of the power turbine assembly most remote from the turbine 4, the sleeve 8 and shaft 10 are provided with a thrust collar 58 threaded thereover which operates in axial contact with a bushing 60 and a portion of the conventional bearing surface 18. Lubricant is supplied to the bearing 18 and thrust collar 58 through a bore 62 disposed in the turbine housing and is then channeled through the orifices 64 in the thrust collar.

In operation, working fluid in the liquid phase, or a fluid compatible therewith, is supplied under pressure through the supply bores 32 and 34 to fill the chamber 30 and to be exhausted through the tapered annulus of the insert 28 into the turbine chamber. Since the annulus is tapered, a pressure distribution, operating in accordance with principles well known in the art, is set up around the hub 6. This distribution lifts the hub 6 from, and forces it into concentric relationship with the insert 28. The hub 6 then floats in a nearly concentric annular film in the insert 28 in opposition to the force of gravity acting on the turbine and shaft even though there is not yet relative rotation this thereby avoids rubbing of the surfaces at starting of the turbine and resulting damage to the bearing.

As has been stated before, the conventional bearings 16 and 18 act as the primary support for the turbine and shaft. The only force imposed on the bearing formed by the insert 28 and hub 6 is the weight of that end of the turbine-shaft assembly less the upward spring force caused by flexure of the shaft.

When the turbine is started and brought up to speed, the bearing supports the hub 6 on a fluid film in concentric relationship to the insert 28 partly through the above-described pressure distribution and partly by a film generated by rotation of the hub in a manner well known in hydrostatic-dynamic bearing theory.

As also has been mentioned above, the fluid utilized in the hydrostatic-dynamic bearing may be a composition other than the working fluid of the turbine so long as the fluid utilized is compatible with the working fluid and is noncontaminating so as to decrease the efficiency thereof in the vapor cycle. The bearing permits the use of fluids which normally do not have good lubricating properties since a full hydrostatic-dynamic bearing film is maintained between rotating parts. The hydrostatic-dynamic lubricant fluid should be supplied to the chamber 30 at a pressure sufficiently greater than the working fluid in the turbine section so that the fluid velocity through the annulus formed by the hub 6 and the insert 28 is great enough to provide a fluid pressure distribution sufficient to lift the hub from contact with the insert. Once the turbine is at operating speed, the pressure in chamber 30 may be reduced to a certain degree, if desired, since the fluid film and pressure field generated by the rotation of the hub can itself support all or part of the load of the turbine and shaft. The fluid bearing is disposed adjacent and most proximate the turbine so that there is no possibility of contamination of the working fluid in the turbine from this source since the lubricant utilized in this bearing is compatible with or the same as the working fluid.

As before mentioned, the fluid bearing must be isolated from the normal mechanical forces imposed on the device through the mechanical drive train and should be relieved of a major portion of the weight of the turbine and shaft. This is accomplished in FIGURE 1 by the use of the flexible shaft 10 in combination with the annular sleeve 8 surrounding the shaft. Since the sleeve is supported at both ends by conventional mechanical bearings which bracket the gear 12, most of the radial forces acting on the system thereby are isolated in the sleeve and bearings preventing transmission of radial force to the flexible shaft 10. The shaft is designed with sufficient flexibility and shock absorbing capability to act as a torsional spring isolating torsional gear tooth vibrations and the like from the bearing and turbine wheel. It is also important that the shaft 10 be made flexible enough so that the threaded end which is connected to the sleeve 8 merely serves as a connection to transmit thrust and torque. The shaft should be flexible enough so that no transverse load of any consequence is transmitted from the threaded end thereof to the end proximate the turbine. This is extremely important since there are essentially three or more bearings in line and misalignment of the bores, shaft, or bearings would cause large transverse bearing loads to be imposed. Flexibility of the shaft minimizes any load caused by misalignment and keeps the loads on the hydrostatic-dynamic and conventional bearings limited to the weight of the shaft and turbine, when stationary, or to the reaction of the weight and rotating forces when rotating. The arrangement as thus far described thereby directs the major bearing loads, both radial and thrust to an essentially independent external shaft (sleeve 8), the bearings of which are lubricated in a conventional manner with hydrocarbon lubricants or the like.

A primary remaining problem confronting the device, as thus far described, lies in providing and maintaining over long periods of time absolute segregation between the conventional lubricant for the bearing 16 and the fluid acting as a lubricant for the hydrostatic-dynamic bearing. This is accomplished, in part, by the sealing members 40 and 48 and the floating ring 46. The floating ring 46 is loosely centered, in the chamber formed by the bore 54, around the shaft 10 and is maintained in sliding abutment with the lapped sealing surfaces of the seal members 40 and 48 by the spring 44 which biases the sealing member 40 thereagainst. The lapped sealing surfaces of the members are equal in rubbing diameter and area so that the ring will normally rotate at about one-half of the shaft speed thereby maintaining the rubbing speed of the seals at a minimum. It is further possible to design the seal faces with a small rubbing diameter and, therefore, minimize rubbing speeds and smaller potential leakage area. This can be achieved since the minimum diameter of the seals can be brought down to a size slightly in excess of the size of the threaded connection between the shaft 10 and the sleeve 8.

Further seal efficiency is afforded by maintaining the pressure of the hydrostatic-dynamic lubricant supply delivered through the channels 32–34 and the pressure of the conventional lubricant fluid in the chamber formed by the bore 54 nearly equal so that there is a minimum pressure differential across the seal faces and, therefore, a minimum tendency for leakage through the seal. This basic constructure permits operation of the turbine with a minimum possibility of loss of operating fluid or contamination of the operating fluid from the turbine and a maximum seal life.

To avoid undue pressures between the sealing surfaces from pressure differentials across the sealing faces, the seal rubbing diameter is such that it is substantially the same as that of the cylindrical seal surfaces 38 and 50, thereby preventing axial force from being applied to the sealing members through a pressure differential across the seal.

It should be further noted that the disposition of the flexible shaft 10 within the annular sleeve 8 provides a compact structure since, in essence, the shaft doubles back on itself and thereby provides in the same axial space, both a flexible shaft and a rigid bearing supported shaft for the outer portion of the structure. The configuration of the sleeve and shaft also permits the use of a small diameter seal located between, and very close to the supporting bearings for both the shaft 10 and sleeve 8.

In the device as described above, the sealing members are particularly effective in segregating fluids in liquid form. When the turbine is shut down, it is generally desirable to shut down the oil pressure sources and the source supplying the working fluid for the fluid bearing. In these instances most of the liquid will flow out of the sealing area leaving the seal faces free of liquid on either side. It has long been established that a mechanical seal contact face is less likely to leak and will leak less when liquid instead of gas molecules are present at the interface of the seals. Therefore, under these conditions and when the power plant is shut down there is some likelihood that the gas from the working fluid within the sleeve 8 and sealing members will eventually leak into the space formed by the bore 54. In these instances this space could be vented to the atmosphere or to the fluid system for return of the fluid leaking past the seals.

Figure 2:
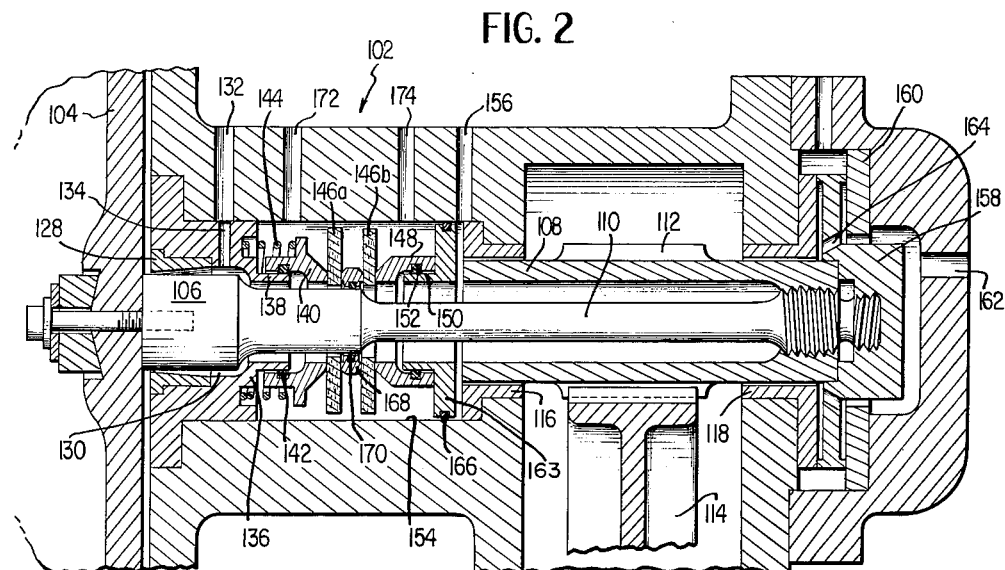
FIGURE 2 is a view similar to FIGURE 1 showing a modification of the sealing structure thereof.

The leakage above-described could also be prevented by a modified system shown in FIGURE 2. In this figure, parts thereof corresponding to like parts of FIGURE 1 are indicated by like numerals of the next higher order. The basic variation in this system lies in the provision of an additional fluid space interposed between the hydrostatic-dynamic bearing fluid and the conventional lubricant space. In this structure, both the sealing member 140 and the sealing member 148 are non-rotating and bear against a pair of floating rings 146a and 146b. The sealing member 148 is mounted on a stationary annular collar 163 concentrically disposed in the bore 154 and sealed to the walls thereof by an O-ring-type gasket 166. A cylindrical sealing surface 150 is formed on the collar 163 as a reduced portion thereof. A third annular sealing member 168 is rotatably mounted on the shaft 110 and is sealed thereto by an O-ring-type packing 170. The structure presented in FIGURE 2 then defines three segregated chambers, the working fluid chamber supplied by bore 132, and the lubricant chamber supplied by the lubricant supply channel 156 separated from one another by a center chamber formed by the bore 154. A supply and return bore, 172 and 174, respectively, connect the chamber formed by the bore 154 with a source of fluid pressure (not shown).

In operation the bores 172 and 174 supply a fluid under pressure to the center chamber. This fluid may be the same as the working fluid or as the lubricating fluid or may be different from but compatible with one or the other or both. The primary advantage afforded by this arrangement is that, when the turbine is shut down, the bores 172 and 174 can be completely shut off, thereby trapping liquid in the center chamber formed by the bore 154. In this manner a complete liquid barrier is perpetually maintained between the lubricating oil space and the turbine working fluid space thereby continually maintaining the efficiency of the sealing members of the device by maintaining the sealing faces flooded at shutdown. In order to allow for expansion or contraction in the interposed center chamber, it is advisable to have a pressure equalizing the spaced formed by bore 154 and the working fluid or lubricant space. This pressure equalizer can be in the form of a flexible diaphragm, a bellows, a flexible bag, a floating piston or controlled relief valve. The variation of FIGURE 2, therefore, permits the turbine to be shut down for indefinite periods without any danger of leakage of the fluid through the sealing surfaces of the seal.

Figure 3:
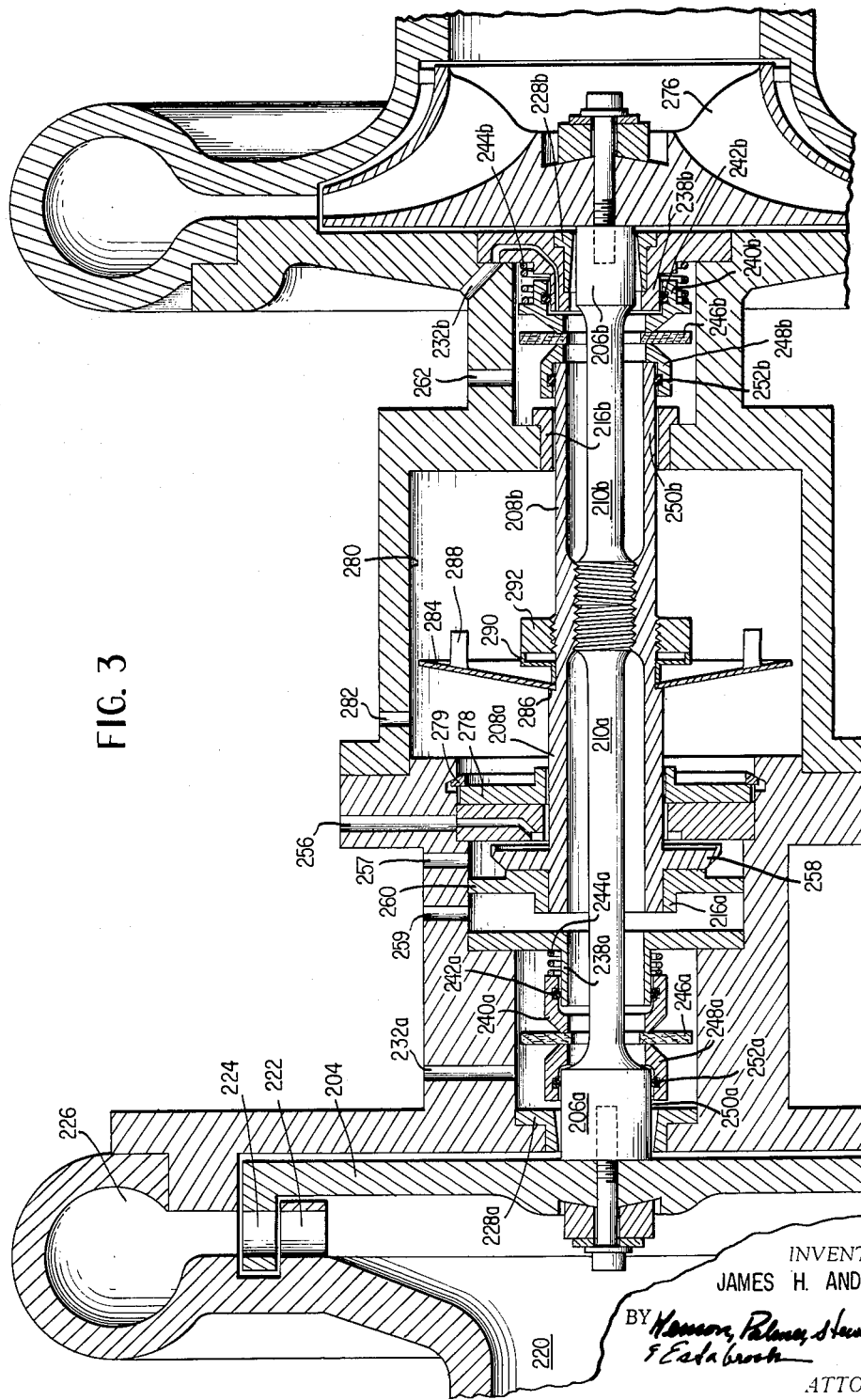
FIGURE 3 is an elevational view, in section and partly broken away, of a pair of fluid bearings and a pair of sealing structures in accordance with the invention incorporated in a compressor-turbine structure.

Turning now to FIGURE 3 of the drawings, an additional use of the bearings and sealing devices embodying the features of this invention is shown. In this embodiment a centrifugal compressor 276 is paired with a turbine 204 and an essentially duplicate set of the above-described hydrostatic-dynamic bearing and seal structures are provided at either end of the connecting shaft. This shaft is essentially made up of flexible shafts 210a and 210b with the sleeve for supporting the mechanical loads of the system formed from the sleeves 208a and 208b integrally connected to extend in opposing directions towards the turbine and compressor respectively. The shafts 210a and 210b are threaded into oppositely threaded connections at the center of the structure formed by the two sleeves. Thrust loading between the compressor and turbine is taken up by a thrust collar 258 mounted on the sleeve 208a which abuts a transverse bushing 260 mounted to the turbine-compressor housing. Lubrication for the thrusts sleeve 258 is supplied through the lubricant supply channel 256, a portion of the lubricant discharging through lubricant discharge channel 257 with the remaining portion being fed through the bearing 260 and discharged through the fluid discharge channel 259. A portion of the fluid also leaks through a floating ring seal 278, held in place by snap ring 279, into the chamber 280 where it may be vented to the atmosphere through port 282 or returned to a sump (not shown) for recirculation. The bearings and seals of the turbine-compressor are essentially the same as those described for the apparatus of FIGURES 1 and 2 with slight modifications to provide adaptation for the particular uses in the turbine-compressor structure. The seals and the bearings operate in the same general manner as outlined above and, although the structures shown adapted for this purpose are primarily those illustrated in FIGURE 1, obviously, the interposed liquid structures of FIGURE 2 could be substituted therefore without departing from the scope of this invention.

On high-speed turbine driven compressors it is generally advisable to have a means for measuring the rotative speed of the compressor and a means for shutting down the unit when the maximum design speed of the system is exceeded. This is accomplished, in FIGURE 3, by an overspeed trip disc 284 in a form of a Belleville spring mounted around the sleeve 208a and bearing against a shoulder 286 formed thereon. Weights 288 are mounted around the periphery of the spring 284. The spring is held against the shoulder 286 by a retaining spring 290 and, as the rotary speed of the shaft increases, the centrifugal force of the weights produce a moment on the disc which, at some speed determined by the design of the disc and location of the weights, will snap to reverse the conical shape thereof. A switch, mechanical trigger or valve can be operated by the disc snapping over to close off the valves of the turbine supply thereby shutting down the machine. The speed could also be measured in this device by having the known number of weights rotate past an electrical proximity device of any of the types commonly in use, the proximity device counting the passage of the weights against time to produce a speed measuring device and overspeed tripping device.

It should be obvious that the above-described structure may be used in any suitable situation where sealing requirements are critical and is, therefore, not limited to the particular uses described. What is set forth above is primarily intended to aid those skilled in the art in the practice of the invention. It should, therefore, be understood that, within the scope of the appended claims, the invention may be practiced otherwise than as specifically described.

What is new and desired to be protected by Letters Patent of the United States is:

1. In rotating turbo-machinery having at least a bearing mounted fluid driven turbine, means to positively segregate bearing lubricants from the working fluid thereof including:
   a housing;
   rotative means mounted in said housing, said rotative means having a driving turbine at one end and a driven means proximate the other end thereof;
   a hydrostatic-dynamic bearing supporting the end of said rotative means adjacent said turbine comprising a bearing mount disposed in said housing, said mount defining a bore therein disposed in spaced relationship around said rotative means, means to hydrostatic-dynamically lubricate said bearing with a pressurized fluid;
   means including conventional bearings supporting said rotative means and spaced from said hydrostatic-dynamic bearing to isolate mechanical forces transmitted through said rotative means, means to lubricate said conventional bearings;
   and spring loaded rubbing face seal means disposed between the hydrostatic-dynamic bearing lubricant and the conventional bearing lubricant to provide positive sealing therebetween.

2. In rotating turbo-machinery having at least a bearing mounted fluid driven turbine, means to positively segregate bearing lubricants from the working fluid thereof including:
   a housing;
   rotative means mounted in said housing, said rotative means having a driving turbine at one end and a driven means proximate the other end thereof;
   a hydrostatic-dynamic bearing supporting the end of said rotative means adjacent said turbine comprising a bearing mount in said housing, said mount defining a bore therein disposed in spaced relationship around said shaft, means to hydrostatic-dynamically lubricate said bearing with a pressurized fluid;
   said rotative means comprising a flexible shaft coaxially mounted at one end thereof to said turbine, an annular sleeve mounted in coaxial spaced relationship around said flexible shaft proximate the end thereof opposite said turbine, said sleeve extending to a point intermediate the ends of said shaft, conventional bearings supporting said sleeve at either end thereof, a lubricant chamber surrounding the end of said sleeve intermediate the ends of said shaft, and means to supply lubricant under pressure to said conventional bearings and said chamber, whereby mechanical forces imposed on said rotative means are absorbed by said sleeve and said conventional bearings and are isolated from said hydrostatic-dynamic bearing by said flexible shaft;
   and means disposed between said hydrostatic-dynamic bearing and said lubricant chamber to provide sealing therebetween.

3. In rotating turbo-machinery as set forth in claim 1 wherein said
   means disposed between said hydrostatic-dynamic bearing and said conventional bearings to provide sealing therebetween includes at least one annular non-rotating shoulder concentrically disposed around said shaft, an annular non-rotating seal member slidably and sealably mounted around said shoulder, at least one floating seal ring disposed around said shaft in abutting sealing relationship on one side thereof to said non-rotative sealing member, a cylindrical surface associated with shaft and rotatable therewith, said surface disposed adjacent to said seal ring on the side thereof opposite said nonrotative sealing member, an annular rotating sealing member slidably and sealably mounted around said cylindrical surface in abutting sealing relationship to said floating ring, and biasing means urging at least one of said sealing members toward said seal ring, and means to equalize the pressure between the fluid and the lubricant.

4. In rotating turbo-machinery having at least a bearing mounted fluid driven turbine thereto, means to positively segregate bearing lubricant from the working fluid thereof including:
   a housing;
   rotative means mounted in said housing, said means having a driving turbine at one end and a driven means proximate the other end thereof;
   a hydrostatic-dynamic bearing supporting the end of said rotative means adjacent said turbine comprising a bearing mount in said housing, said mount defining a bore therein disposed in spaced relationship around said rotative means, means to hydrostatic-dynamically lubricate said bearing with a pressurized fluid compatible with the working fluid of said turbine;

said rotative means comprising a flexible shaft coaxially mounted at one end thereof to said turbine, an annular sleeve mounted in coaxial spaced relation around said flexible shaft proximate the end thereof opposite said turbine and extending to a point intermediate the ends thereof, conventional bearings supporting said sleeve at either end thereof, a lubricant chamber surrounding the end of said sleeve intermediate the ends of said shaft, and means to supply lubricant under pressure to said conventional bearings and said chamber, whereby said sleeve and said conventional bearing absorb transverse mechanical forces imposed on said rotative means, and said flexible shaft isolates said hydrostatic-dynamic bearing from mechanical forces;

means disposed between said hydrostatic-dynamic bearing and said lubricant chamber to provide sealing therebetween comprising at least one annular non-rotative shoulder concentrically disposed around said shaft, an annular non-rotating seal member slidably and sealably mounted around said shoulder, a floating seal ring disposed around said shaft in abutting sealing relationship one one side thereof to said non-rotating sealing member, a cylindrical surface associated with said shaft and rotatable therewith, said surface disposed adjacent said seal ring on the side thereof opposite said non-rotating sealing member, an annular rotative sealing member slidably and sealably mounted around said cylindrical surface in abutting sealing relationship to said floating rings, and biasing means urging at least one of said members towards said seal ring, said means to equalize the pressure between the fluid and the lubricant.

5. In rotating turbo-machinery having at least a bearing mounted fluid driven turbine, means to positively segregate bearing lubricants from the working fluid thereof including:

a housing;

rotative means mounted in said housing, said means having a driving turbine at one end and a driven gear proximate the other end thereof;

a hydrostatic-dynamic bearing supporting the end of said rotative means adjacent said turbine comprising a bearing mount in said housing, said mount defining a bore therein, an enlarged cylindrical hub on said rotative means, said hub disposed in spaced relationship in said bore, said bore tapering inwardly toward said turbine, means to hydrostatic-dynamically lubricate said bearing with a pressurized fluid compatible with the working fluid of said turbine;

said rotative means comprising a flexible shaft coaxially mounted at one end thereof to said turbine, an annular sleeve mounted in coaxial spaced relation around said flexible shaft proximate the end thereof opposite said turbine and extending to a point intermediate the ends thereof, conventional bearings supporting said sleeve at either end thereof, a lubricant chamber surrounding the end of said sleeve intermediate the ends of said shaft, and means to supply lubricant under pressure to said conventional bearings and said chamber, whereby said sleeve and said conventional bearings absorb transverse mechanical forces imposed on said rotative means and said flexible shaft isolates said hydrostatic-dynamic bearing from mechanical forces;

means disposed between said hydrostatic-dynamic bearing and said lubricant chamber to provide sealing therebetween, said means including at least one annular non-rotating shoulder fixed to said mount and disposed in concentric spaced relationship to said shaft, said shoulder having a transverse face thereto, an annular non-rotating seal member slidably and sealably mounted around said shoulder, a floating seal ring disposed around said shaft in transverse abutting relationship to said non-rotating seal member, an annular rotating shoulder having a transverse face substantially equal in diameter and area to the transverse face on said non-rotating shoulder, said rotating shoulder being coaxially mounted on said sleeve adjacent the side of said floating ring opposite said non-rotating shoulder, an annular rotating seal member slidably and sealably mounted around said rotating shoulder in transverse abutting relationship to said floating seal ring, the abutting surfaces of said sealing members and said ring being substantially equal in diameter and area to the transverse faces of said shoulders, whereby axial forces acting on said members due to pressure differential across the abutting faces thereof are substantially eliminated, and means urging at least one of said sealing members toward said seal ring, and means to equalize the pressure between the fluid and the lubricant.

6. In rotating turbo-machinery having at least a bearing mounted fluid driven turbine, means to positively segregate bearing lubricants from the working fluid thereof including:

a housing;

rotative means mounted in said housing, said means having a driving turbine at one end and a driven gear proximate the other end thereof;

a hydrostatic-dynamic bearing supporting the end of said rotative means adjacent said turbine comprising a bearing mounted in said housing, said mount defining a bore therein disposed in spaced relationship around said rotative means, means to hydrostatic-dynamically lubricate said bearing with a pressurized fluid;

said rotative means comprising a flexible shaft coaxially mounted at one end thereof to said turbine, an annular sleeve mounted in coaxial spaced relationship around said flexible shaft proximate the end thereof opposite said turbine, said sleeve extending to a point intermediate the ends of said shaft, conventional bearings supporting said sleeve at either end thereof, a lubricant chamber surrounding the end of said sleeve intermediate the ends of said shaft, and means to supply lubricant under pressure to said conventional bearings and said chamber, whereby mechanical forces imposed on said rotative means are absorbed by said sleeve and said conventional bearings and are isolated from said hydrostatic-dynamic bearing by said flexible shaft;

sealing means disposed between said hydrostatic-dynamic bearing and said lubricant chamber to provide sealing therebetween, said means including two annular non-rotating shoulders fixed to said housing and disposed in opposed concentric spaced relationship around said shaft, an annular non-rotating seal member slidably and sealably mounted around each of said shoulders, two floating seal rings disposed around said shaft, each of said seal rings being in a transverse abutting relationship to one of said non-rotating seal members, a cylindrical sealing surface on said shaft between said floating rings, an annular rotating seal member slidably and sealably mounted on said surface in transverse abutting relationship to each of said floating seal rings, and means to bias at least one of said non-rotating sealing members in opposition to the other of said non-rotating sealing members to provide sealing abutment between said sealing members and said seal rings, said shoulder sealing members and seal rings forming a center chamber therearound, means to supply a fluid under pressure to said center chamber and means to selectively confine fluid in said center chamber when said machinery is shut down, and means to equalize the pressure between the fluids and the lubricant.

7. Sealing means in accordance with Claim 6 wherein said shoulders have transverse surfaces which are substantially equal in diameter and area to one another and wherein the abutting surfaces of said sealing members are substantially equal in diameter and area to the transverse surfaces of said shoulders, whereby axial forces acting on said members due to pressure differentials across the abutting faces thereof are substantially eliminated.

8. In rotative turbo-machinery having a bearing mounted fluid driven turbine connected to a fluid driving compressor, means to positively segregate bearing lubricants from the working fluid thereof including:

a housing;

rotative means mounted in said housing, said means have a driving turbine at one end and a driven compressor at the other end thereof;

a hydrostatic-dynamic bearing around the end of said rotative means adjacent said turbine and said compressor comprising a bearing mount in said housing, said mount defining a bore therein disposed in spaced relationship around said rotative means, means to hydrostatic-dynamically lubricate said bearings with a pressurized fluid compatible with the working fluid of said turbine and compressor;

said rotative means comprising a pair of flexible shafts, the first of said shafts being coaxially mounted at one end thereof to said turbine, the second of said shafts being coaxially mounted at one end thereof to said compressor, said shafts being coaxially disposed with respect to one another and connected together at the free ends thereof, an annular sleeve mounted in coaxial spaced relation around each of said flexible shafts proximate the connected ends thereof and extending to points intermediate the ends thereof, bearings supporting said sleeves at the ends thereof intermediate the ends of said shaft and at a point intermediate the ends of one of said sleeves, lubricant chambers surrounding the ends of said sleeves intermediate the ends of said shaft, and means to supply lubricant under pressure to said bearings and said chambers whereby transverse and vibrational mechanical forces imposed on said rotative means are absorbed by said sleeves and said bearings and said flexible shafts isolate said hydrostatic-dynamic bearings from cyclical mechanical shocks;

means disposed between each of said hydrostatic-dynamic bearings and said chambers to provide sealing therebetween, said means including at least one annular non-rotating shoulder fixed to said housing and disposed in concentric relationship around said shaft, an annular non-rotating sealing member slidably and sealably mounted around said shoulder, a floating seal ring disposed around said shaft in transverse abutting relationship to said non-rotating sealing member, an annular rotating shoulder associated with said shaft for rotation therewith adjacent the face of said floating ring opposite said non-rotating shoulder, an annular rotating seal member slidably and sealably mounted around said rotating shoulder in transverse abutting relationship to said floating seal ring, and biasing means associated with said non-rotating sealing member to urge said sealing member in sealing relationship against said floating seal ring, and means to substantially equalize the pressure between said fluid and said lubricant.

9. Sealing means in accordance with claim 8 wherein said shoulders have transverse surfaces which are substantially equal in diameter and area to one another and wherein the abutting surfaces of said sealing members are substantially equal in diameter and area to the transverse surfaces of said shoulders, whereby axial forces acting on said members due to pressure differentials across the abutting faces thereof are substantially eliminated.

10. In a rotating shaft suported by hydrostatic-dynamic and conventional bearings including means to supply dissimilar lubricants to said bearings under pressure, means to segregate said lubricants comprising:

sealing means disposed between said bearings, said sealing means including at least one non-rotating shoulder in spaced relationship around said shaft and having a transverse face thereto, an annular non-rotating sealing member slidably and sealably mounted around said shoulder, a floating seal ring disposed in spaced relationship around said shaft in transverse abutting relationship on one side thereof to said non-rotating sealing member, a cylindrical surface associated with said shaft and rotatable therewith, said surface disposed adjacent said seal ring on the side thereof opposite said non-rotating sealing member, an annular rotative sealing member slidably and sealably mounted around said cylindrical surface in transverse abutting sealing relationship to said floating ring, the transverse abutting faces of said members being substantially equal in diameter and area to the transverse face of said shoulder whereby axial forces acting on said members due to pressure differentials across the abutting faces thereof are substantially eliminated, and means to bias at least one of said sealing members against said seal ring;

and means to substantially equalize the pressure between the lubricants to minimize pressure differentials across the abutting faces of the sealing members and seal ring.

11. A means to segregate lubricants in accordance with claim 10 wherein said sealing means includes two oppositely disposed non-rotating shoulders, said shoulders, said sealing members and said seal rings defining a center chamber therearound, wherein means are provided to supply a fluid under pressure to said center chamber and to confine fluid thereto when said shaft is not rotating, and wherein means are provided to substantially equalize pressure between said fluid and said lubricant when said shaft is rotating and to stabilize pressure in said fluid when said shaft is not rotating.

12. In a rotating shaft supported by bearings including means to supply lubricants to said bearings under pressure, means to isolate said lubricants from the ambient environment comprising:

sealing means disposed between said bearings and said environment including at least one non-rotating shoulder in spaced relationship around said shaft and having a transverse face thereto, an annular non-rotating sealing member slidably and sealably mounted around said shoulder, a floating seal ring disposed in spaced relationship around said shaft in transverse abutting relationship on one side thereof to said non-rotating sealing member, a cylindrical surface associated with said shaft and rotatable therewith, said surface disposed adjacent said seal ring on the side thereof opposite said non-rotating sealing member, an annular rotative sealing member slidably and sealably mounted around said cylindrical surface in transverse abutting sealing relationship to said floating ring, the transverse abutting faces of said members being substantially equal in diameter and area to the transverse face of said shoulder whereby axial forces acting on said members due to pressure differentials across the abutting faces thereof are substantially eliminated, and means to bias at least one of said sealing members against said seal ring;

and means to substantially equalize the pressure between the lubricants to minimize pressure differentials across the abutting faces of the sealing members and seal ring.

13. A means to isolate lubricants in accordance with claim 12 wherein said sealing means includes two oppositely disposed non-rotating shoulders, said shoulders, said sealing members and said seal rings defining a center chamber therearound, wherein means are provided to supply a fluid under pressure to said center chamber and to confine fluid thereto when said shaft is not rotating, and wherein means are provided to substantially equalize pressure between said fluid and said lubricant when said shaft is rotating and to stabilize pressure in said fluid when said shaft is not rotating.

References Cited by the Examiner

UNITED STATES PATENTS

| | | | |
|---|---|---|---|
| 2,319,913 | 5/1943 | Bentley | 308—9 |
| 3,015,524 | 1/1962 | Slayter et al. | 308—9 |

ROBERT M. WALKER, *Primary Examiner.*